United States Patent
Nick

(10) Patent No.: US 10,777,067 B2
(45) Date of Patent: Sep. 15, 2020

(54) WATER FLOW DETECTOR WFD01

(71) Applicant: Charles Nick, Lufkin, TX (US)

(72) Inventor: Charles Nick, Lufkin, TX (US)

( * ) Notice: Subject to any disclaimer, the term of this patent is extended or adjusted under 35 U.S.C. 154(b) by 68 days.

(21) Appl. No.: 16/212,531

(22) Filed: Dec. 6, 2018

(65) Prior Publication Data
US 2019/0188990 A1 Jun. 20, 2019

Related U.S. Application Data

(60) Provisional application No. 62/708,650, filed on Dec. 18, 2017.

(51) Int. Cl.
| | |
|---|---|
| *G08B 21/20* | (2006.01) |
| *G01M 3/32* | (2006.01) |
| *G08B 21/18* | (2006.01) |

(52) U.S. Cl.
CPC .......... *G08B 21/20* (2013.01); *G01M 3/3263* (2013.01); *G08B 21/182* (2013.01)

(58) Field of Classification Search
None
See application file for complete search history.

(56) References Cited

U.S. PATENT DOCUMENTS

| | | | | |
|---|---|---|---|---|
| 4,061,571 A | * | 12/1977 | Banner | B01D 29/01 210/130 |
| 2002/0108759 A1 | * | 8/2002 | Hagen | A62C 35/68 169/23 |
| 2013/0048549 A1 | * | 2/2013 | Burrows | B01D 61/08 210/232 |
| 2017/0228999 A1 | * | 8/2017 | Joyer | A47K 3/286 |
| 2019/0154196 A1 | * | 5/2019 | Lambe | F16M 11/14 |

* cited by examiner

*Primary Examiner* — John F Mortell

(57) ABSTRACT

A water flow detector comprised of a check valve and parallel flow detection loop in which flow can be measured by monitoring the pressure differential as the difference between the water supply line pressure at the tee on the inlet side of the check valve (high pressure side) and the low pressure being at the tee connection on the downstream or outlet side of the check valve. The proportional water flow in the loop acts on a float which position is detected by optical and electronic means and enables the recognition of very small flows (small leaks) triggering an alarm to signal the leak.

15 Claims, 22 Drawing Sheets

FLOW DETECTOR ASSEMBLY FRONT VIEW

SECTION "A - A"

FLOW DETECTOR ASSEMBLY TOP VIEW FROM FIG. 2 SECTION "A-A"
1/4" = 1"

FLOW DETECTOR ASSEMBLY LEFT SIDE VIEW

SECTION "B - B"

FLOW DETECTOR ASSEMBLY VIEW FROM FIG. 4 SECTION "B-B"
1/4" = 1"

FLOW DETECTOR FLOAT CHAMBER ASSEMBLY FRONT VIEW
1' = 1'

FLOW DETECTOR FLOAT CHAMBER ASSEMBLY LEFT SIDE VIEW
1" = 1"

PARTS OF FIGURE 8

ITEMS 38, 39, 40, AND 41 ARE BUILT BY CUTTING PIECES OF 1 1/4" SCH. 40 PVC PIPE WHICH HAS BEEN SAWED LENGTHWISE WITH APPROX. 1/8" WIDE SAW, INTO IDENTICAL HALVES. THEY ARE THEN USED AS SHOWN FOR BRACING AND SUPPORT OF THE FLOW DETECTOR LOOP PIPING ASSEMBLY. ITEM 39 IS GLUED TO ITEM 38. HOSE CLAMPS 40A AND 41A ARE USED TO CLAMP ITEMS 40 AND 41 WITH ITEM 38 TO FIT AGAINST COUPLINGS 1A AND 18A. THOSE COUPLINGS WHICH, TOGETHER WITH PIPES 1, 1B, 18, AND 18B ARE PART OF THE LOOP PIPING FOR INSTALLATION CONNECTIONS.

ITEMS 43 AND 44 ARE BUILT BY CUTTING A 7/8" LONG PIECE OF 4" SCH. 40 PVC PIPE INTO TWO IDENTICAL HALVES. THEY ARE THEN USED AS SHOWN, STRETCH-FITTED AND CONNECTED WITH SCREWS TO THE OUTSIDE OF ITEM 30 AND BELOW ITEM 38, AS SHOWN, FOR VERTICAL SUPPORT OF THE FLOW DETECTOR LOOP PIPING ASSEMBLY.

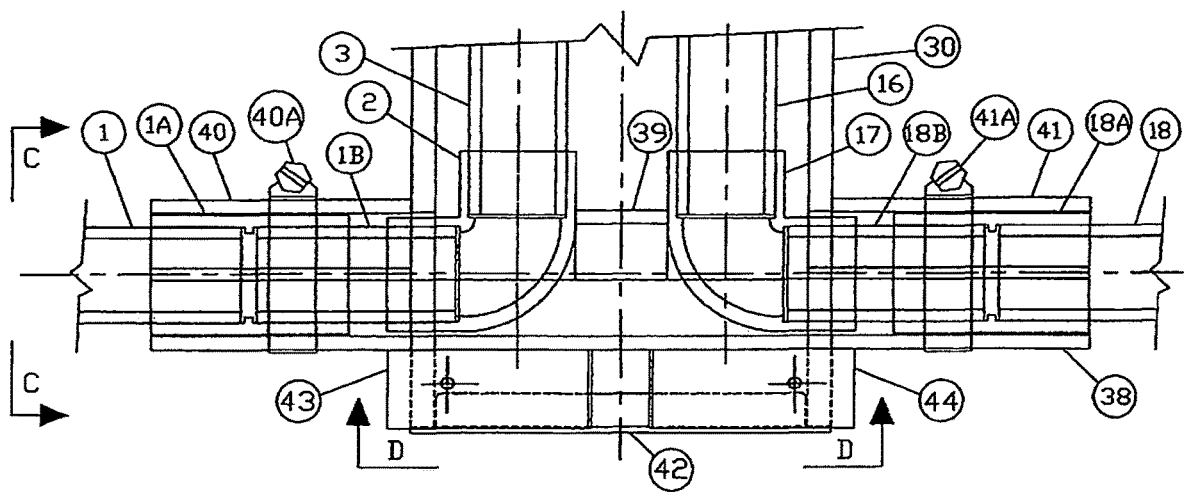

FIGURE 8
FLOW DETECTOR ASSEMBLY BASE FRONT VIEW
1/2" = 1'

FLOW DETECTOR ASSEMBLY BASE
LEFT SIDE VIEW FROM FIG. 8 SECTION "C-C"
1/2" = 1"

FLOW DETECTOR ASSEMBLY BASE
BOTTOM VIEW FROM FIG. 8 SECTION "D-D"
1/2" = 1"

FLOW DETECTOR NYLON ROD FLOAT ITEM 8
SIDE VIEW AND END VIEW
1" = 1"

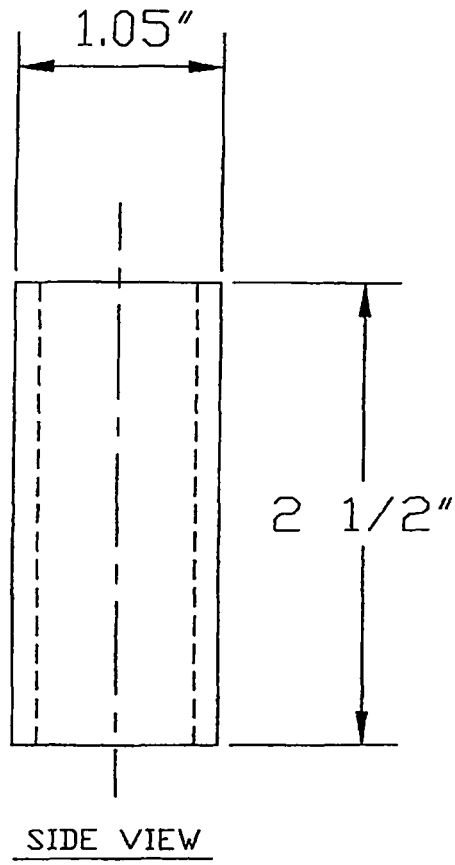
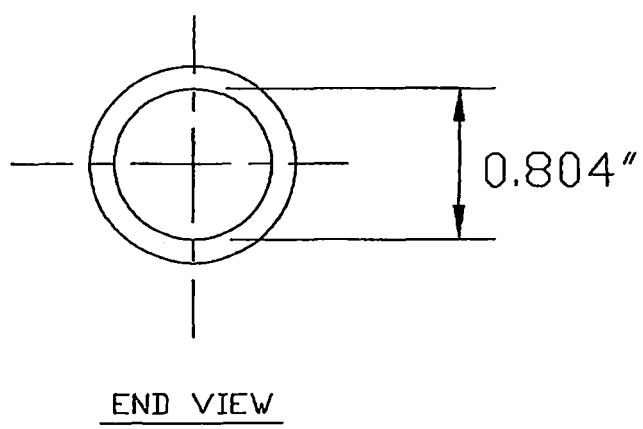
FIGURE 12
FLOW DETECTOR FLOAT CHAMBER WALL CLEAR PIPE ITEM 7
SIDE VIEW AND END VIEW
1" = 1"

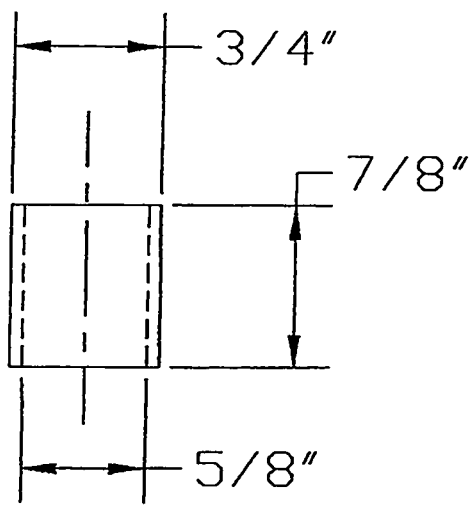
SIDE VIEW
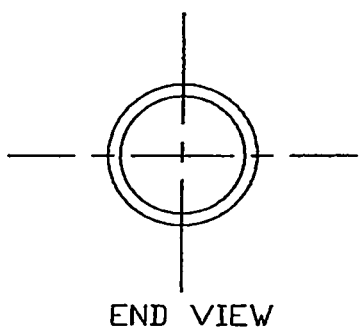
END VIEW
FIGURE 13
FLOW DETECTOR FLOAT CHAMBER BOTTOM STOP-SPACER ITEM 6
SIDE VIEW AND END VIEW
1" = 1"

FLOW DETECTOR OPTICAL EMITTER MOUNTING PVC ITEM 21
FACE VIEW AND END VIEW
1" = 1"

FLOW DETECTOR OPTICAL RECEIVER (PHOTOTRANSISTOR) MOUNTING PVC ITEM 22
FACE VIEW AND END VIEW
1" = 1"

FLOW DETECTOR OPTICAL EMITTER MOUNTING
DOUBLE BACKED TAPE ITEM 19A
FACE VIEW AND END VIEW
1" = 1"

FLOW DETECTOR OPTICAL RECEIVER (PHOTOTRANSISTOR) MOUNTING
DOUBLE BACKED TAPE ITEM 20A
FACE VIEW AND END VIEW
1" = 1"

SIDE VIEW AND END VIEW (TYPICAL)

CIRCUIT CARD SCHEMATIC AND OTHER CONNECTIONS

List of Material for Circuit Card WX01

| Qty | Ref # | Value | Package | MFG | MFG PN# |
|---|---|---|---|---|---|
| 1 | C1 | 2.2uF 10% 16V Tant | 4.5x7 radial 2.5sp | AVX | TAP225K016SCS |
| 1 | C2 | 0.1uF 25V Ceramic | 2.5x4 2.5sp | Vishay | K104Z15Y5VE5TL2 |
| 1 | C3 | 4.7uF 10% 16V Tant | 4.5x7 radial 2.5sp | AVX | TAP475K016SCS |
| 1 | D1 | 400V 1A standard | DO-41 | Diodes Inc | 1N4004-T |
| 7 | R1, 3, 4, 6, 7, 9, 10 | 10K 1/4 watt, 5% | Axial 2.3x6.5 | Stackpole | CF14JT10K0 |
| 4 | R2, 8, 11, 14 | 220 1/4 watt, 5% | Axial 2.3x6.5 | Stackpole | CF14JT220R |
| 3 | RA, 5, 13 | 1M 1/4 watt, 5% | Axial 2.3x6.5 | Stackpole | CF14JT1M00 |
| 1 | R12 | 100K 1/4 watt, 5% | Axial 2.3x6.5 | Stackpole | CF14JT100K |
| 1 | RB | 470K 1/4 watt, 5% | Axial 2.3x6.5 | Stackpole | CF14JT470K |
| 1 | U1 | 555 Timer | 8L DIP | TI | TLC555CP |
| 1 | U2 | Comporator | 8L DIP | Fairchild | LM393AN |
| 2 | Q1, 2 | TRANS PNP 40V 0.2A | TO-92 | Fairchild | 2N3906BU |
|   |   |   |   |   |   |

FIGURE 20

List of Material for Water Flow Detector WFD01

| Item | Description |
|---|---|
| 1 | PVC pipe, sch. 40, 3/4", 5 in. length |
| 1A | PVC sch 40 coupling, 3/4", Lasco 429-007 |
| 1B | PVC pipe, sch.. 40, 3/4", 2 1/8 in. length |
| 2 | PVC sch 40 elbow, 3/4", Lasco 406-007 |
| 3 | PVC pipe, sch. 40, 3/4", 13 3/8 in. length |
| 4 | PVC sch 40 coupling, 3/4", Lasco 429-007 |
| 5 | Stainless steel washer, 1" O.D., 1/16" thick, 7/16"I.D. |
| 6 | PVC tubing, 3/4" O.D. (I.D. = 5/8"), 7/8" long |
| 7 | Clear PVC pipe, sch 40, 3/4" (O.D. = 1.05", I.D.. = 0.804"), 2 1/2 in. long |
| 8 | Nylon (101) rod, 3/4" dia., 1" long, with 3/32" hole drilled through length at center of diameter |
| 9 | PVC sch 40 coupling, 3/4", Lasco 429-007 |
| 10 | Stainless steel washer, 1" O.D., 1/16" thick, 7/16"I.D. |
| 11 | |
| 12 | PVC pipe, sch.. 40,3/4", --- in. length |
| 13 | PVC sch 40 elbow, 3/4", Lasco 406-007 |
| 14 | |
| 15 | PVC sch 40 street elbow, 3/4" FM slip to 3/4" M slip, Lasco 409-007 |
| 16 | PVC pipe, sch. 40, 3/4",18 5/16" length |
| 17 | PVC sch 40 elbow, 3/4", Lasco 406-007 |
| 18 | PVC pipe, sch. 40, 3/4", 5" length |
| 18A | PVC sch 40 coupling, 3/4", Lasco 429-007 |
| 18B | PVC pipe, sch. 40, 3/4", 2 1/8" length |
| 19 | Optek Technology Emitter OPB100-EZ part of emitter-phototransistor pair OPB100-Z |
| 19A | Double-back tape (adhesive on both sides) 1/16" thick , 5/16 " wide x 13/16 " long |
| 20 | Optek Technology Phototransistor OPB100-SZ part of emitter-phototransistor pair OPB100-Z |
| 20A | Same as19A |
| 21 | Piece of one half of 1 1/4' PVC pipe sawed along length (approx. 1/8" saw width) into two equal halves, 1 3/4" long |
| 22 | Piece of one half of 1 1/4' PVC pipe sawed along length (approx. 1/8" saw width) into two equal halves, 1 3/4" long |
| 23 | Hose clamp, for 1 1/4 " pipe, American Valve 55349 |
| 24 | Circuit board WX01 ---from ETechnet --- (see separate mat'l list) |

FIGURE 21 A

List of Material for Water Flow Detector WFD01 (Items 1-24)

| | |
|---|---|
| 25 | Battery holder 3-AA cell in series, Digikey BC3AAW-ND |
| 26 | Red LED, Kingbright WP5603SIDL, from Mouser |
| 27 | Plastic board, 1/16" thick, 3" high, 4 1/8" wide (one of 2 boards for mtg circuit board, battery pack, and light) |
| 28 | Plastic board, 1/16" thick, __" high,, 3" wide (one of 2 boards for mtg circuit board, battery pack, and light) |
| 29 | PVC 4" insert-type test cap, , at Home Depot --- DWV knock out test cap, (or D131-040) |
| 30 | PVC pipe sch 40, 4", 16.5" long |
| 31 | PVC pipe sch 40, 4", 5.75" long |
| 32 | PVC pipe sch 40, 4", 4 1/4" long |
| 33 | PVC sch 40, No-hub pipe coupling, 4", at Coburns --- 42212308, Metal with pipe clamps, with rubber couplintg seal removed |
| 34 | Same as 33 |
| 35 | PVC 4' pipe test cap, 4", at Coburns--- Charlotte Techno-cap or Test-tite 43479 Techno-cap ,or IPS87515 |
| 36 | Clear sch 40 , PVC pipe, 3/4" (O.D. = 1.05", I.D.. = 0.804"), 2 " long |
| 37 | PVC sch 40 pipe cap, 3/4", Lasco 447-007 |
| 38 | Piece of one half of 1 1/4' PVC pipe sawed along length (approx. 1/8" saw width) into two equal halves, 10" long |
| 39 | Piece of one half of 1 1/4' PVC pipe sawed along length (approx. 1/8" saw width) into two equal halves, 1" long |
| 40 | Piece of one half of 1 1/4' PVC pipe sawed along length (approx. 1/8" saw width) into two equal halves, 3 1/8" long |
| 40A | Hose clamp, for 1 1/4 " pipe, American Valve 55349 |
| 41 | Piece of one half of 1 1/4' PVC pipe sawed along length (approx. 1/8" saw width) into two equal halves, 3 1/8" long |
| 41A | Hose clamp, for 1 1/4 " pipe, American Valve 55349 |
| 42 | PVC 4" insert-type test cap, , at Home Depot --- DWV knock out test cap, (or D131-040) |
| | |
| Other miscellaneous | |

| | |
|---|---|
| xx | wire |
| xx | wire connectors |
| xx | screws |
| xx | Rubberized caulk for electronics moisture protection |
| xx | Glue for pvc pipe |

FIGURE 21 B

List of Material for Water Flow Detector WFD01 (Items 25-42)

WATER FLOW DETECTOR WFD01

CROSS-REFERENCE TO RELATED APPLICATIONS

This application claims the benefit of Applicants' prior provisional application, No. 62/708,650, filed on Dec. 18, 2017, and the aforementioned application is hereby incorporated herein by reference.

STATEMENT REGARDING FEDERALLY SPONSORED RESEARCH OR DEVELOPMENT

Not Applicable.

BACKGROUND OF THE INVENTION

In residential and commercial building settings, water leaks often go undetected for significant periods of time, often with a high water and utility charge being the first indication the homeowner, building owner and/or lessee receives of the leak.

The existence of a flow detection device to effectively monitor for, and notify the homeowner, building owner and/or lessee of, inconspicuous water leaks in the water supply line piping to the interior or on the exterior of a residence or commercial building would serve the joint purposes of avoiding the high cost of wasted water and aid in water conservation. Until the subject invention, no economical or practical method existed (whether by some indicator light or audible alarm) to give an immediate indication when water is flowing through the water supply line, which flow, if all acceptable points of usage are turned off at that time, would indicate a probable leak.

SUMMARY OF THE INVENTION

This invention is a water flow detector device which if properly installed in combination with and connected in parallel with a spring-loaded check valve in the water supply line between a residential or commercial structure and the existing water meter, will provide a method to allow the water supply line downstream piping to be checked for leaks. Downstream flow in the water line will cause a differential pressure across both the flow detector and check valve. With small amounts of differential pressure of about 0.016 psi, at a small flow of about 0.04 gpm through the flow detector, the flow detector will give immediate indication by a blinking light that some flow is occurring in the water supply line. The blinking light will be on for that small differential pressure and flow and will stay on for larger differential pressures and flows either through the flow detector or through the check valve when differential pressure increases to open the check valve. The blinking light will be on whether the flows are normal or leakage, so, if normal points of water usage are turned off at that time, the blinking light will indicate a probable leak.

The water flow detector is a unique assembly of parts, material, and functional concepts or principles, which in their combined purpose in this particular assembly, provides immediate alarm by a blinking light (and provision for connecting further remote alarm device) to indicate there is flow in a water line (typically water supply line to a family residence or commercial structure) by monitoring the pressure differential across a combination of a flow detection piping loop connected in parallel with a spring-return type check valve to be installed in the water line.

DESCRIPTION OF THE DRAWINGS.

Various embodiments of the invention are disclosed in the following detailed description and accompanying drawings.

FIG. 8 illustrates the water flow detector assembly base front view.

FIG. 12 illustrates the water flow detector assembly float chamber wall clear pipe item 7 side view and end view.

FIG. 13 illustrates the water flow detector assembly float chamber bottom stop-spacer item 6 side view and end view.

FIG. 20 is the list of material for the Circuit Card WX01.

FIG. 21 is the list of material for the water flow detector.

DETAILED DESCRIPTION OF THE INVENTION

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Figure 1:
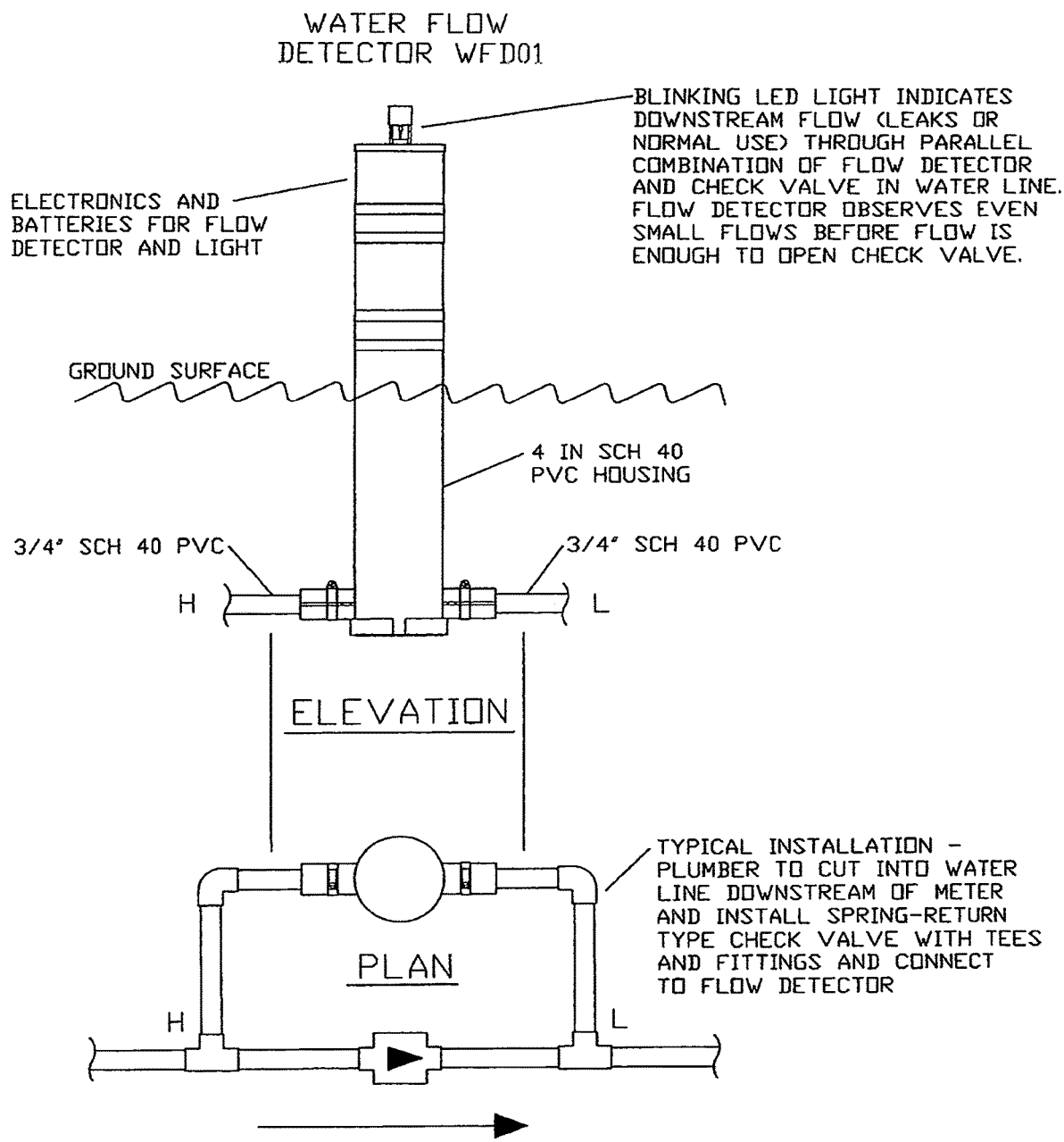
FIG. 1 illustrates a typical installation of the water flow detector along with other installation piping and typical check valve (spring-return type).
Figure 2:
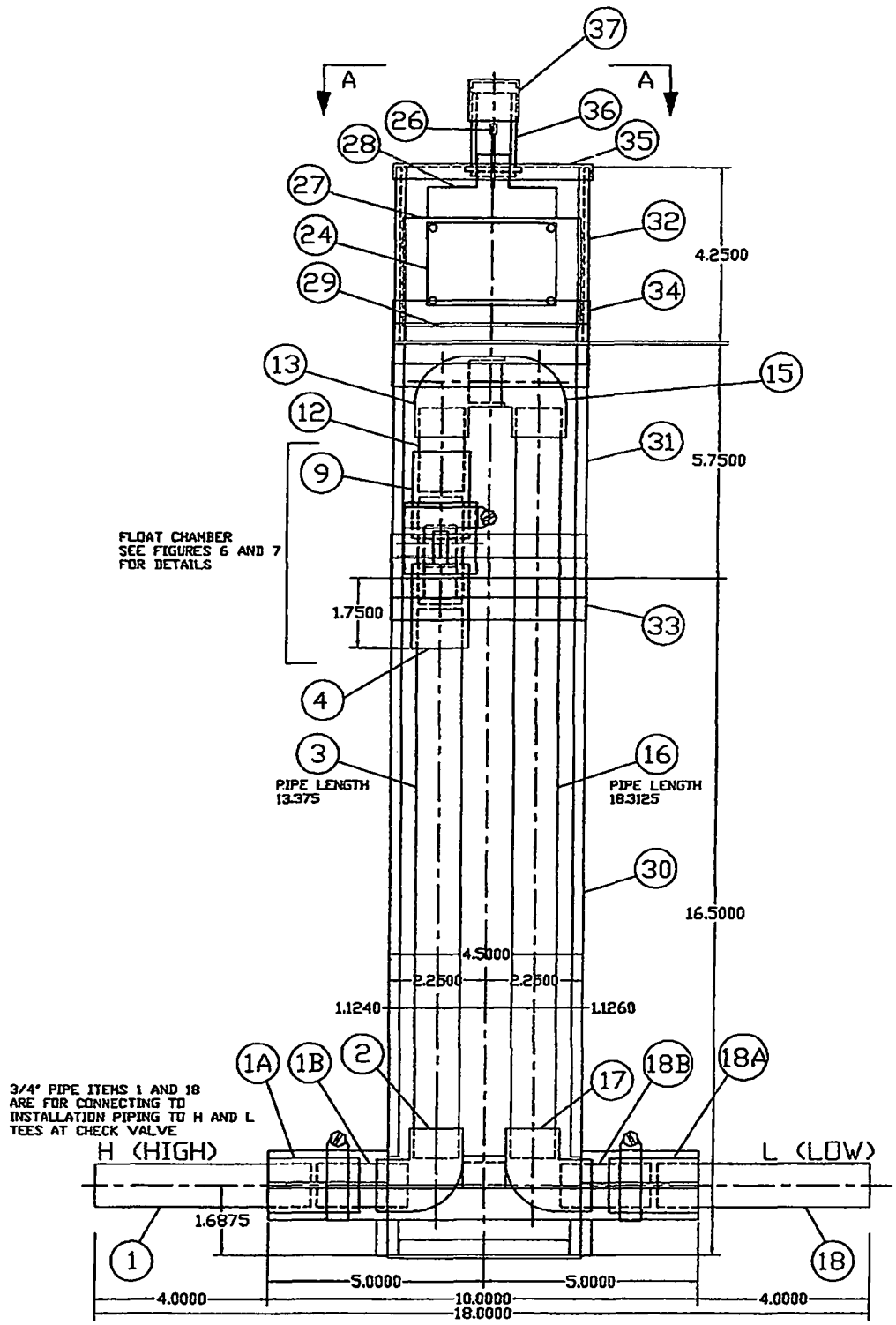
FIG. 2 illustrates the water flow detector assembly front view.
Figure 3:
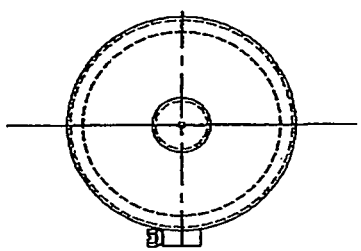
FIG. 3 illustrates the water flow detector assembly top view from FIG. 2 Section "A-A".
Figure 4:
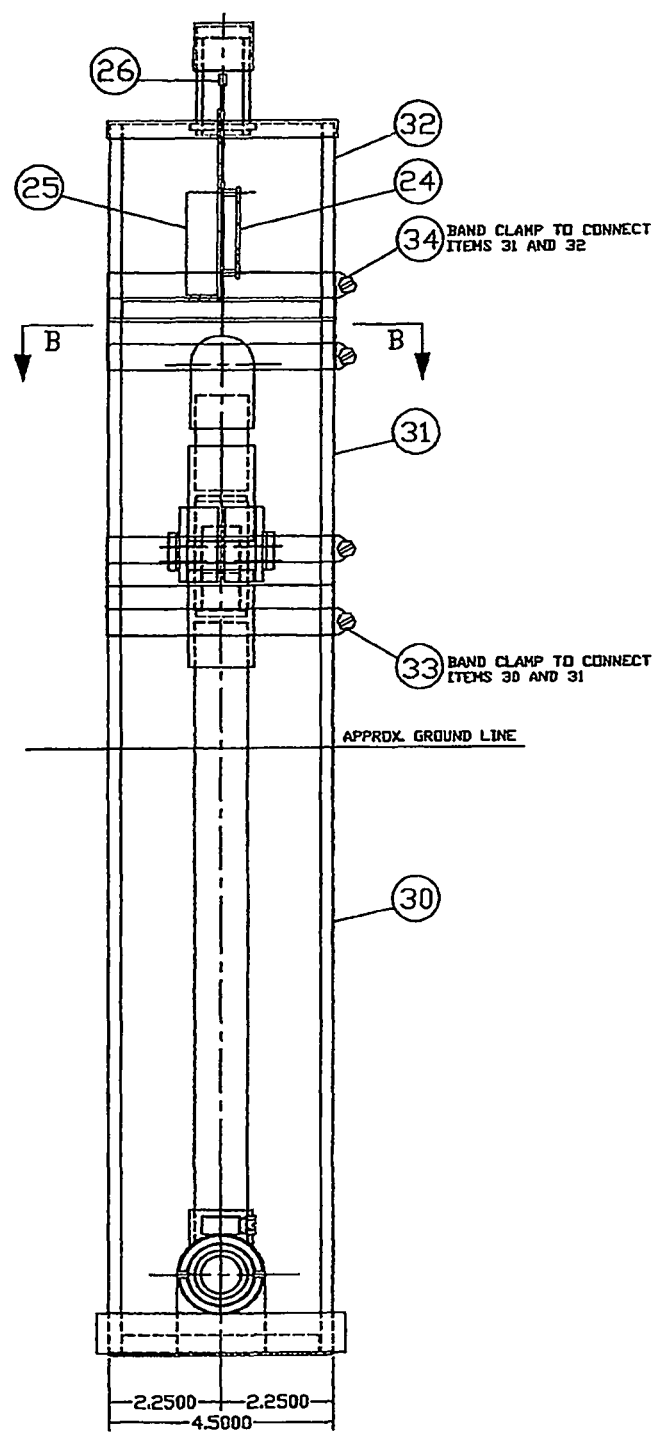
FIG. 4 illustrates the water flow detector assembly left side view.
Figure 5:
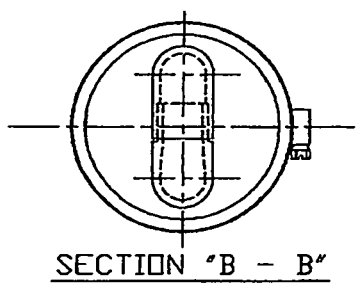
FIG. 5 illustrates the water flow detector assembly top view from FIG. 4 Section "B-B".

FIG. 1 indicates a typical installation of the water flow detector (with its flow detection water piping loop assembly and other internal parts not visible since being enclosed in a 4-inch schedule 40 pvc pipe housing), along with other installation piping and typical check valve (spring-return type).

The check valve (to be selected by the installer) used for this application is dedicated to this flow detection purpose, and should not be confused with any other check valve which may be installed in the water line. Most any typical spring-return type check valve (typically 3/4 " or larger) will be suitable and the spring rate is not critical.

Briefly, some types of parts in the WFD01 flow detection and alarm system consist of:
pvc schedule 40 piping, white color
pvc schedule 40 piping, clear
pvc schedule 40 pipe fittings and using standard solvent joining methods
nylon float for position in water depending on pressure differential and flow
stainless steel washers and vinyl tubing for use as stops for float travel
optical electronics for detecting position of float
electronic circuit card and batteries to work with optical electronics and alarm light for indication that there is some water flow in the water flow detector
alarm indicator light For more detailed list of items in the assembly, refer to List of Material for Water Flow Detector that is included as FIG. 20. The item numbers in that list (and item numbers on drawings) are referred to in the following descriptions.

The flow detection assembly uses a flow detection piping loop connected between tees on each side of the spring-return type check valve in the water line in which flow is to be measured. Thus, the check valve and flow detection loop form a parallel piping combination, in which flow can be measured by monitoring the pressure differential as the difference between the water supply line pressure at the tee on the inlet side of the check valve (high pressure side, referred to as H for high at the tee and at the loop inlet) and the low pressure being at the tee connection on the downstream or outlet side of the check valve (referred to as L for low at the tee and at the loop outlet).

Figure 6:
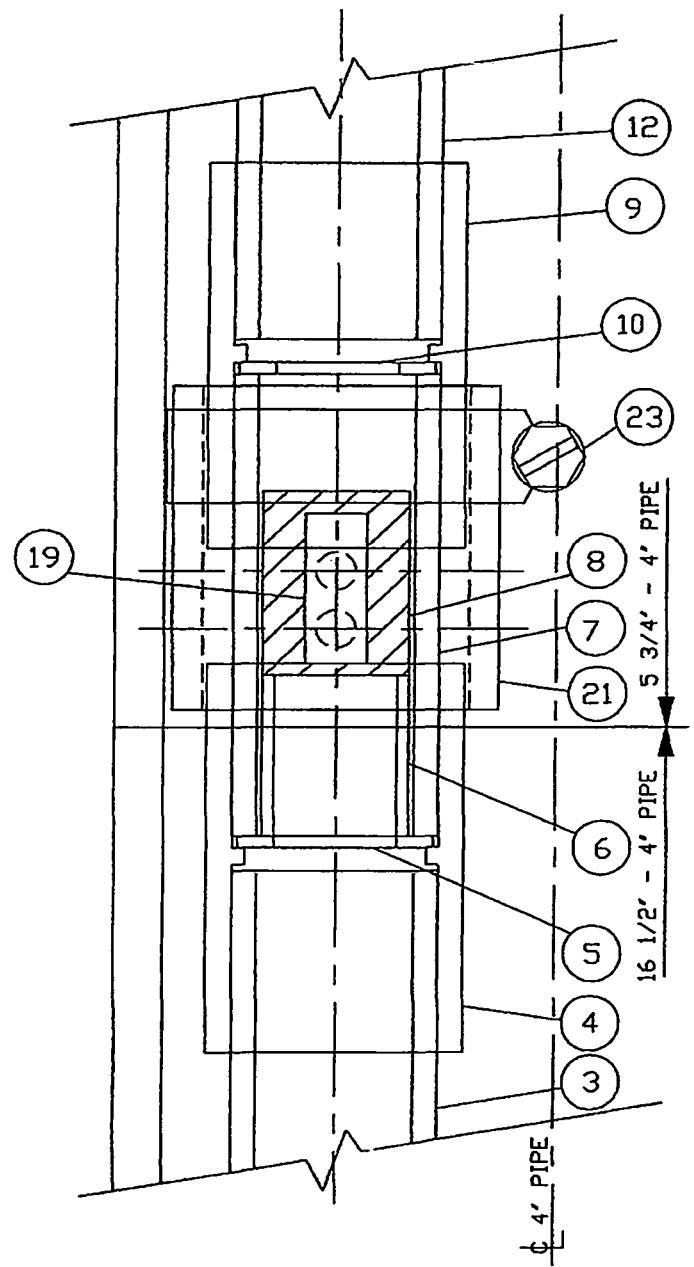
FIG. 6 illustrates the water flow detector float chamber assembly front view.
Figure 7:
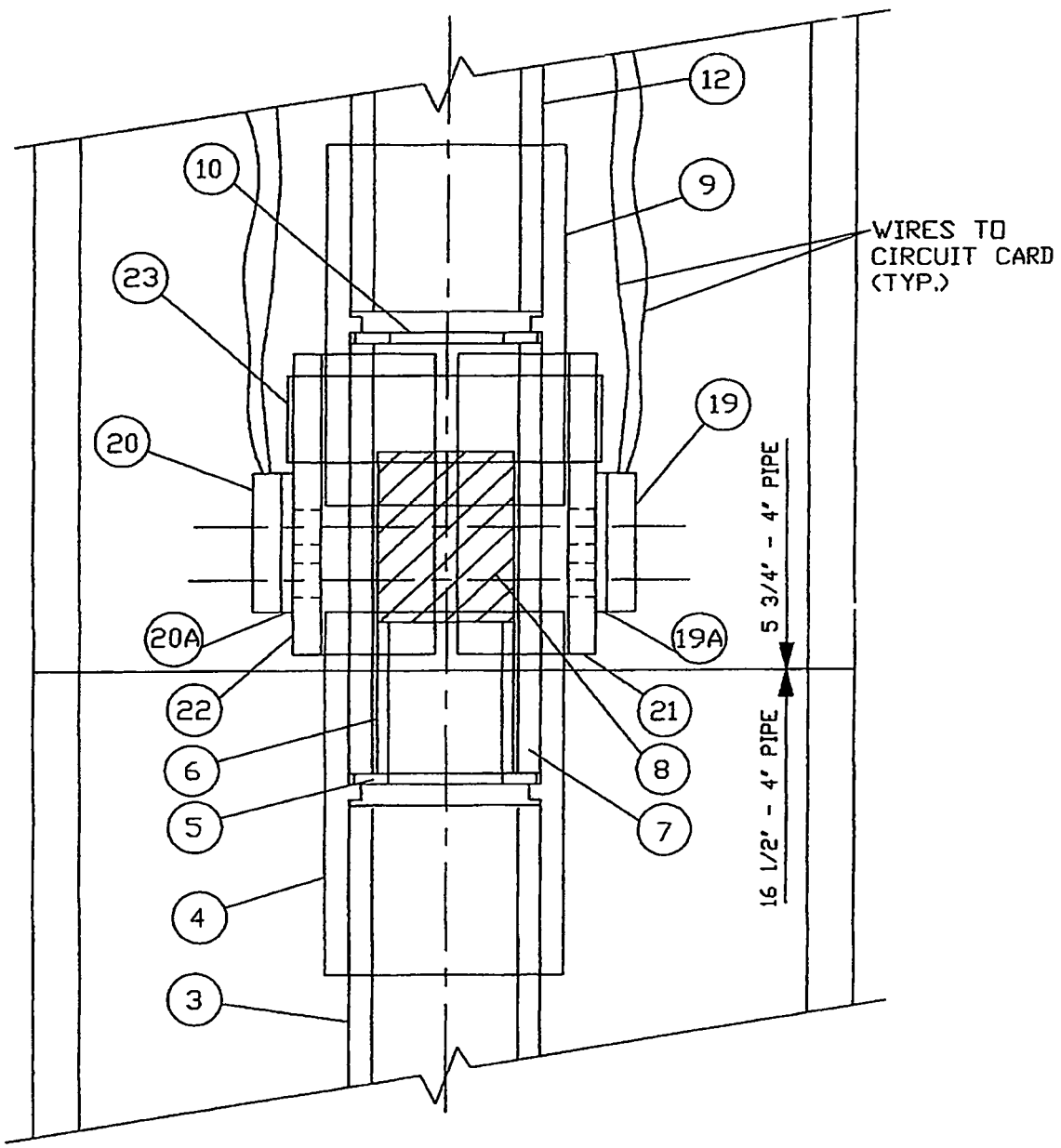
FIG. 7 illustrates the water flow detector float chamber assembly left side view.
Figure 9:
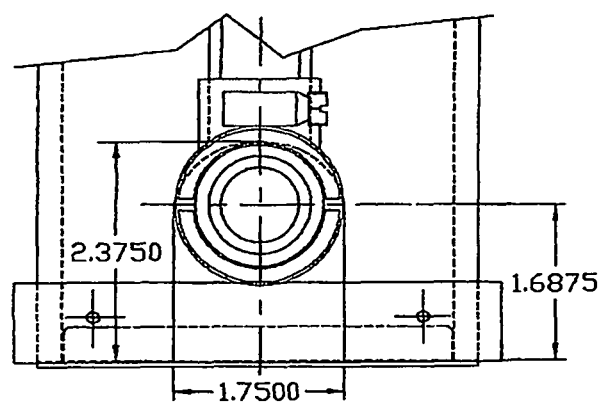
FIG. 9 illustrates the water flow detector assembly base left side view from FIG. 8 Section "C-C".
Figure 10:
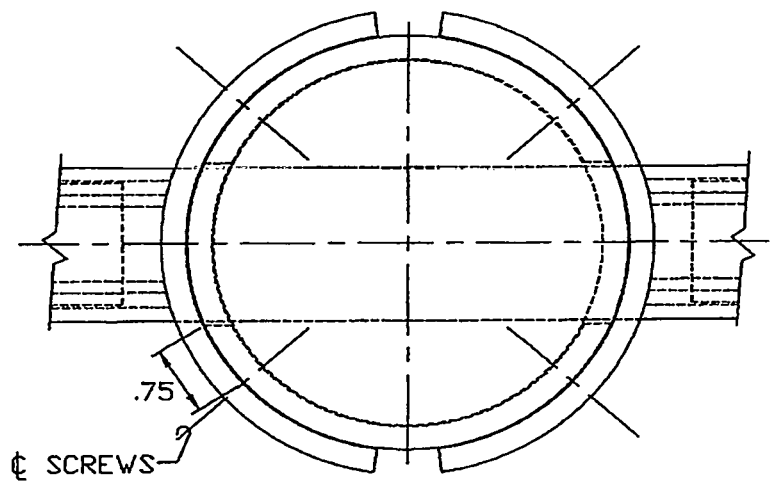
FIG. 10 illustrates the water flow detector assembly base bottom view from FIG. 8 Section "D-D".
Figure 11:
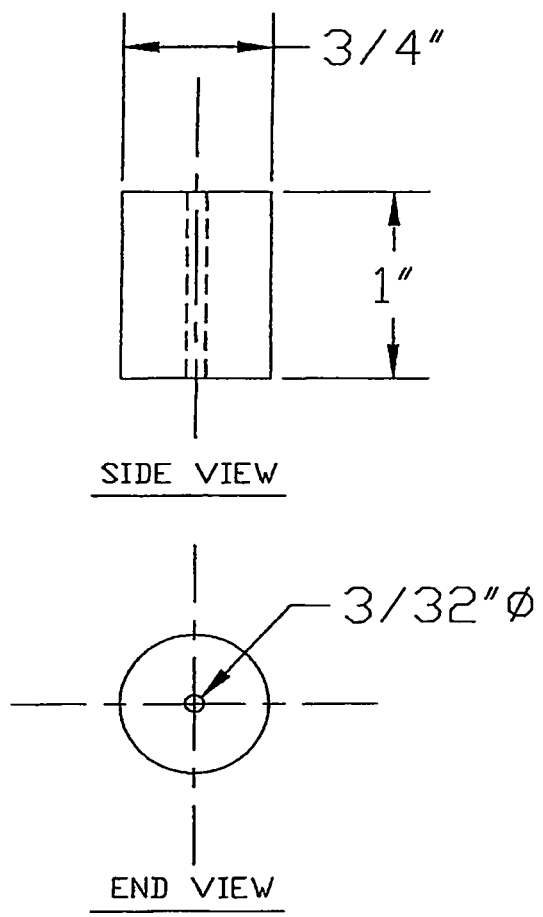
FIG. 11 illustrates the water flow detector assembly nylon rod float item 8 side view and end view.
Figure 14:
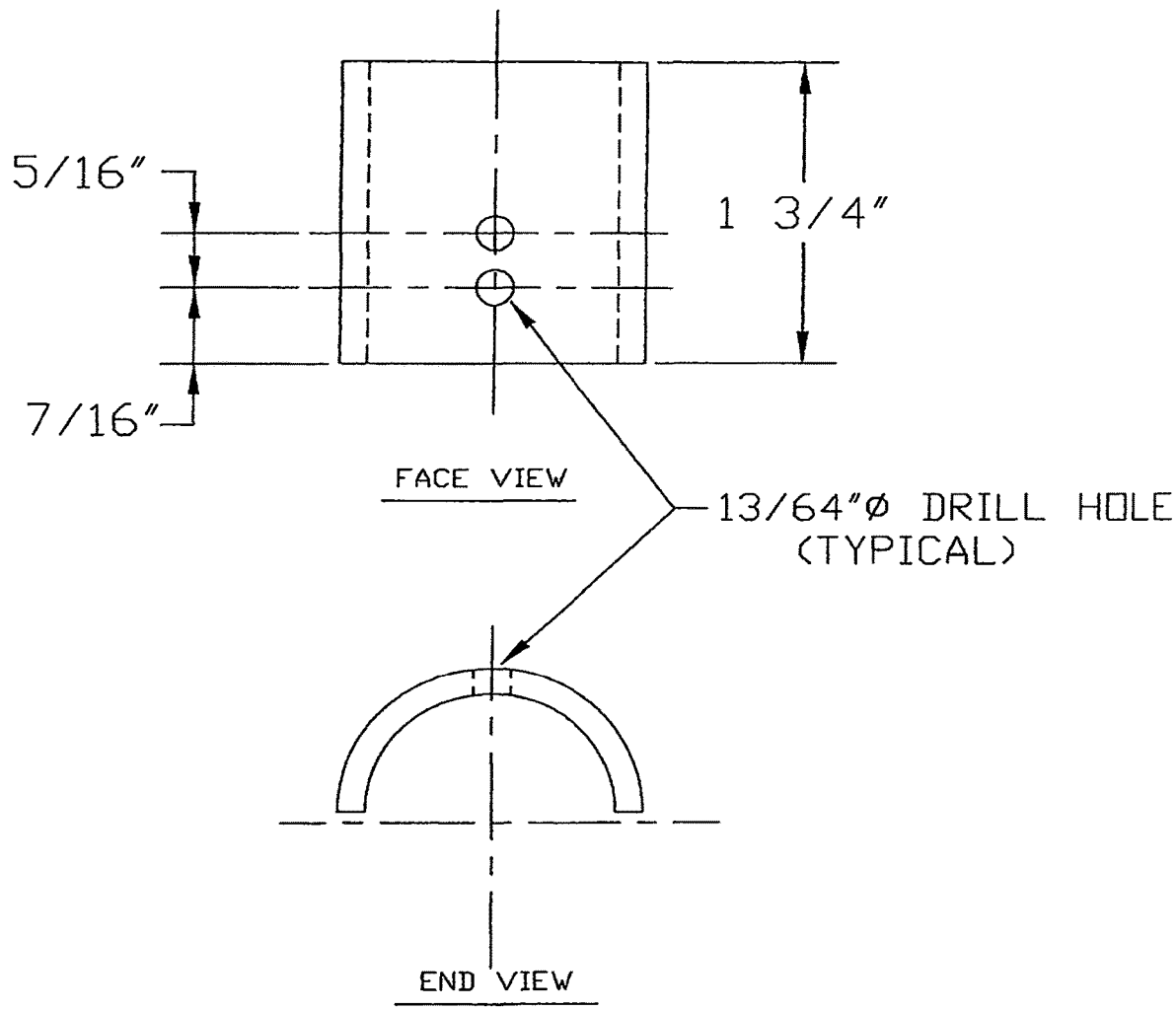
FIG. 14 illustrates the water flow detector assembly optical emitter mounting PVC item 21 face view and end view.
Figure 15:
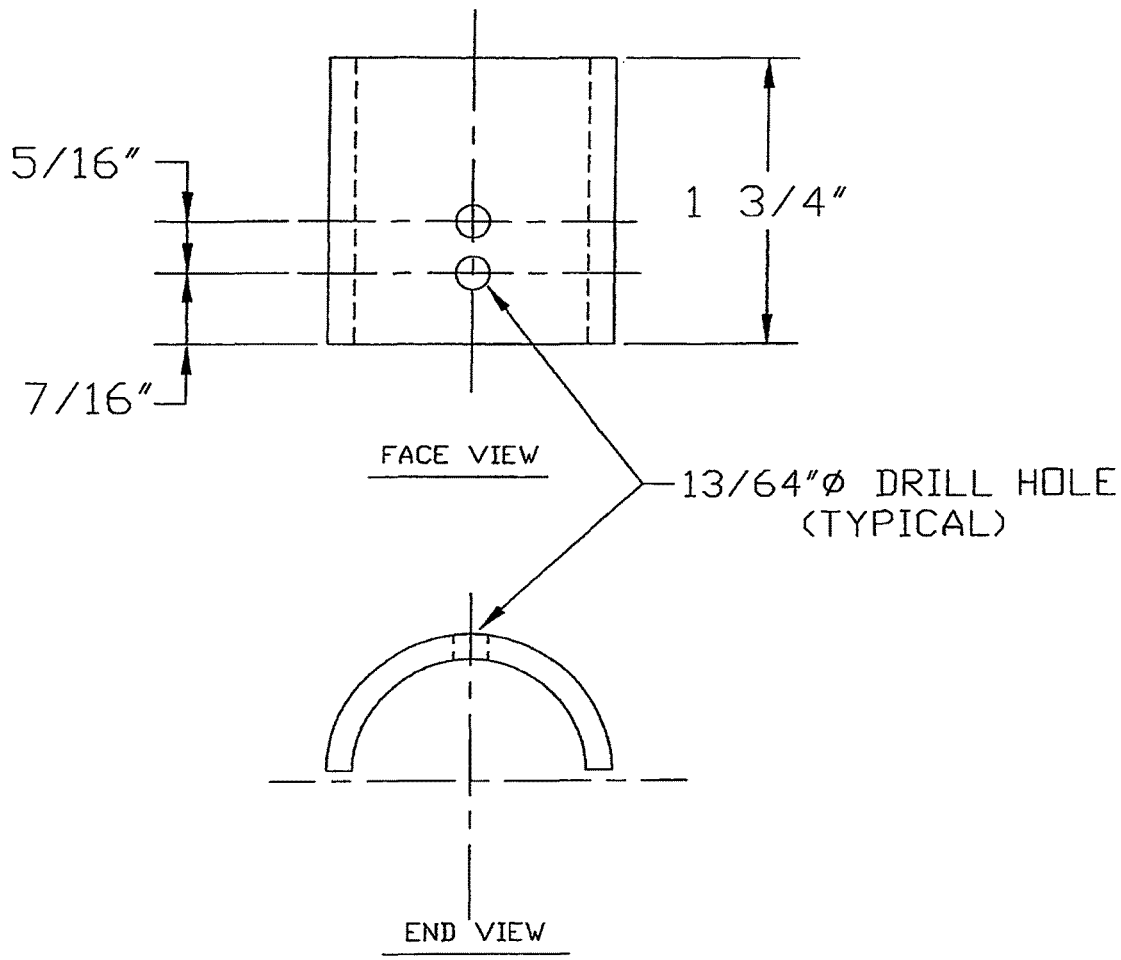
FIG. 15 illustrates the water flow detector assembly optical receiver (phototransistor) mounting PVC item 22 face view and end view.
Figure 16:
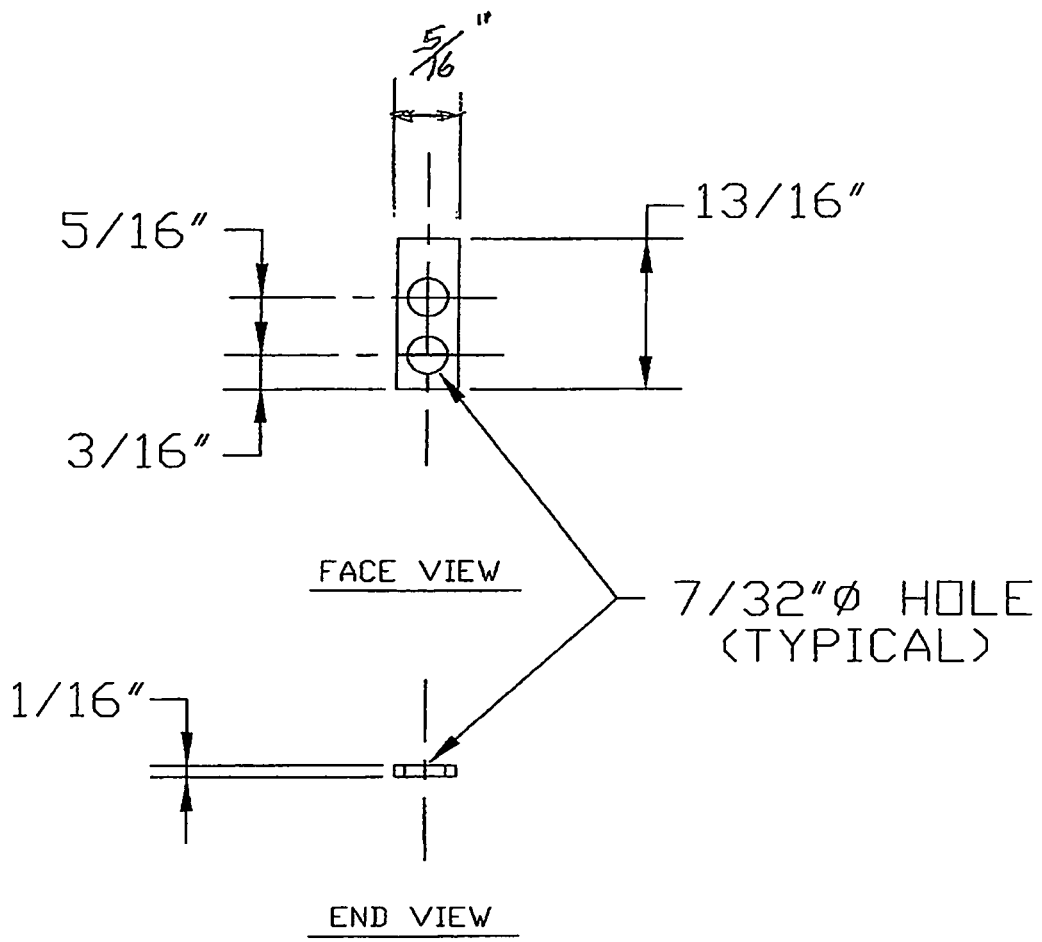
FIG. 16 illustrates the water flow detector assembly optical emitter mounting double backed tape item 19A face view and end view.
Figure 17:
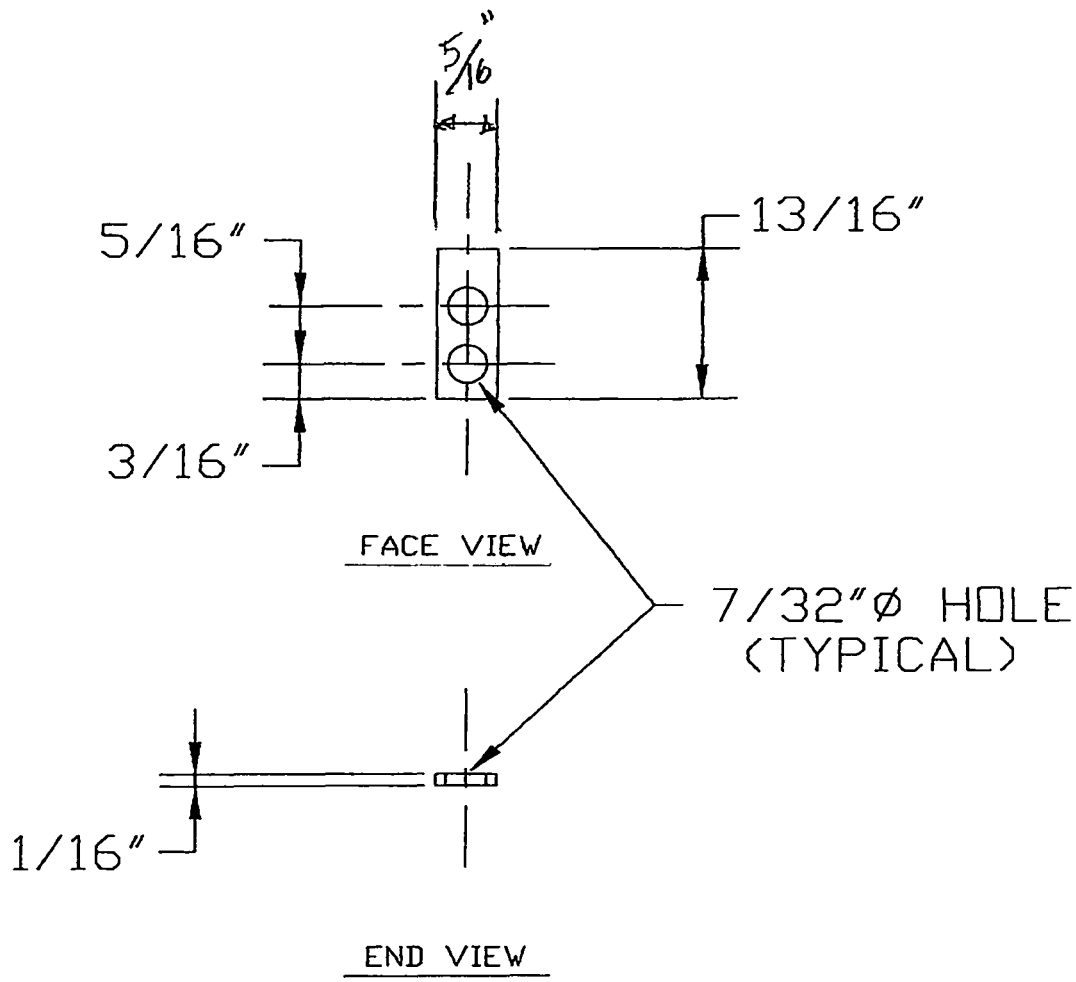
FIG. 17 illustrates the water flow detector assembly optical receiver (phototransistor) mounting double backed tape item 20A face view and end view.
Figure 18:
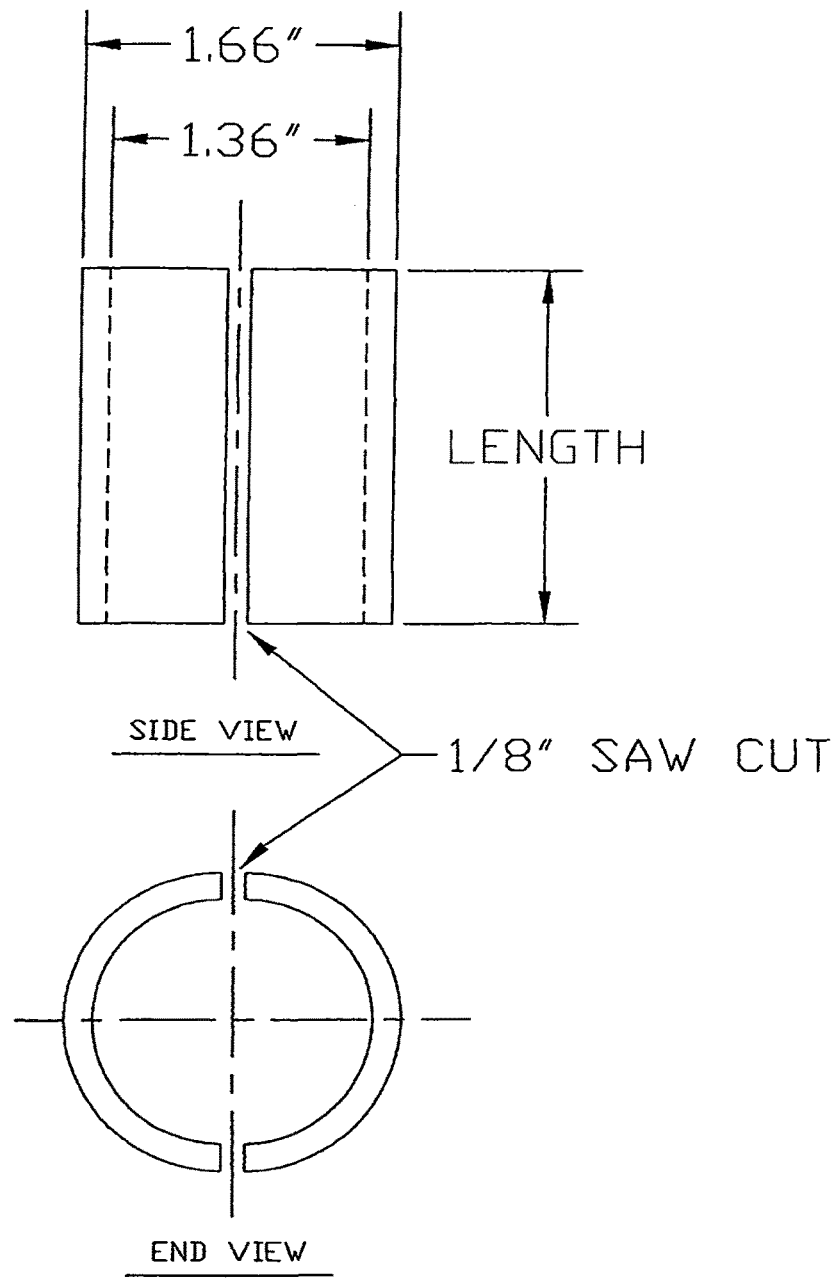
FIG. 18 illustrates the water flow detector assembly side view and end view (typical).

Referring to FIGS. 2, 3,4, and 5 (and to FIGS. 6 and 7 for more detail at float chamber), the flow detection loop flow path (using from left-right for horizontal reference and up-down for vertical reference) proceeds from the H connection tee through pipe connections (depending on installation) to the measurement loop assembly inlet H (flow left-to-right) pipe 1 (and coupling 1A and pipe IB), to elbow 2, to vertical (up) pipe 3, and to the vertical (up) float chamber inlet coupling 4, then through float bottom stop washer 5 and float stop-spacer 6, vertically (up) through the clear pipe float chamber 7, to, through, and around the detector float 8, vertically (up) through the float chamber outlet (top) coupling 9 and float top stop washer 10, through pipe 12 to elbow 13, then horizontally (right) through elbow 15, then vertically (down) through vertical pipe 16, to elbow 17, then horizontally (right) through pipe 18B and coupling 18A to the loop assembly outlet (L connection) pipe 18, and then through other pipe connections (depending on installation) to the tee at low L side of the check valve.

FIGS. 2, 3,4, 5, 6, and 7 shows the water flow path items in the piping loop, including a float chamber section, and also shows some other parts outside the water flow path, such as the optical-electronic items 19 and 20 with their mounting devices 19A, 20A, 21, 22, and hose clamp 23 at the float chamber, the electronic circuit card 24 which is connected by wiring to the optical items, the power supply battery pack 25, and the alarm light 26.

With the water line normally filled with water and with no flow, the pressure at both tees will be the same, thus differential pressure will be zero.

When there is downstream water line flow (water usage or leak), it causes a pressure decrease in the downstream piping and along the pipeline upstream of where the flow is going. That causes a proportional pressure differential across the check valve and the parallel flow detection piping loop, so, depending on the amount of flow and differential pressure, that flow can go through the flow detection loop and/or the check valve. For all amounts of flow, a small amount goes through the loop, including the float chamber for monitoring flow to detect that there is some amount of downstream flow (alarm point amount or more), but check valve flow depends on the downstream flow causing high enough differential pressure to open the check valve against its spring.

The sensitivity of the flow detection loop is such that it can detect a small amount of flow (small leaks of 0.04 gpm at 0.016 psi) before the downstream flow is high enough to cause enough differential pressure to open the check valve.

A typical check valve may have a spring rate of 0.5 to 2 psi (or some valves more or less). If the spring rate is 1 psi then for the valve to open, there must be enough flow in the line downstream of the check valve to allow its outlet pressure to be at least 1 psi less than the inlet pressure of the valve. That is, the valve would start to open with a pressure differential of 1 psi across the valve. If the check valve were alone in the line, without the parallel flow detection piping loop, then just a small amount of downstream flow would cause enough differential pressure to start opening the valve.

However, the flow detection piping loop is connected in parallel with the check valve and a small amount of flow will go through that loop with any amount of pressure differential across the check valve greater than zero. So at very low downstream flow and differential pressure across the parallel combination, all of the water line flow will go through the detection loop, until the flow has increased enough to cause a pressure differential greater than the check valve spring pressure. When the check valve starts opening, it will carry most of the increasing line flow, and a proportional small amount will continue to flow in the flow detection loop.

As the differential pressure causes flow through a float chamber and around and through the float 8, it also causes force against the bottom of the float to add to its slightly-heavier-than-water buoyancy and that differential force across the float lifts the float against gravity force, to change its position in the float chamber 7. Since the float chamber walls are clear which would otherwise allow the light beam from the emitter part of the optical electronics 19 to reach the receiver part of the optical electronics 20 on the other side of the chamber, only the body of the float 8 blocks the light beam. When the flow increases enough to increase the pressure differential causing enough force on the float to move it off the travel stop 6 in the bottom of the float chamber and up to a flow alarm set position (which also depends on the adjustable position of the optical devices 19 and 20), that will allow the light beam from emitter 19 to reach the receiver 20 to trigger the electronic circuit card, 24, to turn on the blinking alarm light, 26, to indicate there is some amount of downstream flow, which could indicate a possible leak in the downstream water system.

Above the alarm flow, if the downstream flow continues increasing causing a higher differential pressure, the float will be pushed up to the stop, 10, in the top of the float chamber. The float will remain above the alarm set flow position and the alarm light will continue to blink as long as the flow and differential pressure is more than the alarm set flow amount. When flow and differential pressure decrease below the alarm set amount, the float will drop to again block the light beam and turn off the blinking alarm light.

Greater Details Of Float Chamber. As flow occurs in the flow detection loop, it is considered that most all of the pressure drop (pressure differential) between the tees will be across the float in the float chamber, since it is expected that the flow resistance of the ¾ inch loop piping (in series with the float chamber) will not cause a significant pressure drop compared to the float chamber. The flow in the float chamber in proportion to its pressure differential will depend on the flow coefficient Cv of the float chamber, which will depend on the flow restriction in the flow paths area between the float and the walls of the float chamber (about 90% of the flow area) and the hole through the float (about 10% of the flow area).

It has been observed that a flow rate of 6 ounces/minute (0.0468 gallons/minute) raises the float by 0.437 inches above the bottom stop.

The float weight equals 1.15 times weight of same volume of water. The float is 1 inch long (1 inch height in the column of water), so additional force of 0.15 inch of water is required to start lifting the float above the bottom stop. So to raise the float by 0.437 inches will require pressure equal to (0.15 +0.437 =0.587) inches of water, and 1 psi is same pressure as a column of water 27.7 inches high, so to raise the float by 0.437 inches will require pressure of 0.0212 psi, that is 0.5875 * (1 / 27.7) =0.0212 psi.

As the float moves up from the bottom stop, most of the travel (up to about 0.5 inches) the flow in gallons/minute (gpm) is proportional to the square root of the differential pressure (psi =(inches of water +0.15) / 27.7) and proportional to the flow coefficient Cv. That is, flow gpm =Cv * sq.rt.(psi). Then, using the above observed information to calculate Cv, flow (0.0468 gpm) =Cv * sq.rt(0.0212 psi), and Cv =0.04687 / 0.1456=0.32. So, at 0.5 inches float travel, psi =(0.5 +0.15) / 27.7 =0.0234 psi, and using that equation, flow gpm =0.32 * sq.rt. (0.0234)=0.049 gpm.

For defining of float position for leak detection alarm point, movement of the float to approximately 0.25 inch above the bottom stop ((0.25 +0.15)/ 27.7 =0.0144 psi) should be enough to detect a water flow of at least or more than 0.038 gallons per minute (gpm). At that point the float will be high enough to allow enough light from the emitter 19 to reach the receiver 20 to cause the circuit card 24 to turn on the blinking light. But to allow for errors, if movement to 0.3 inch (at 0.016 psi) is required, at that point the flow will be 0.04 gpm.

As larger leaks or normal use causes downstream flow and pressure differential to continue increasing above the leak detection alarm amount, when the float nears the top stop (at about 0.62 inch float travel), the float chamber Cv will decrease to about 0.032 (10% of 0.322) when the float hits the top stop. That is, the top stop causes flow around the float between float and walls of chamber to approach zero, but flow in float chamber continues through hole in float. The reduced Cv means less flow through float chamber, but the differential pressure force still holds the float against the top stop.

At that point the pressure differential will be about ((0.62 +0.15)/ 27.7) =0.0279 psi and float chamber flow =0.032* sq.rt. (0.0279) =0.005 gpm.

As downstream flow and pressure differential continues increasing, the check valve will start opening at a differential pressure depending on the check valve spring. If that is 1 psi, at that point float chamber flow =0.032* sq.rt.(I psi) =0.032 gpm. For further downstream flow increase, most of the flow will go through the check valve (but small amount still going through float chamber) and further increase of pressure differential will depend on the flow and check valve size and opening.

When downstream water flow stops, the float in the float chamber will drop below the alarm point and the electronics will turn off the blinking light.

Figure 19:
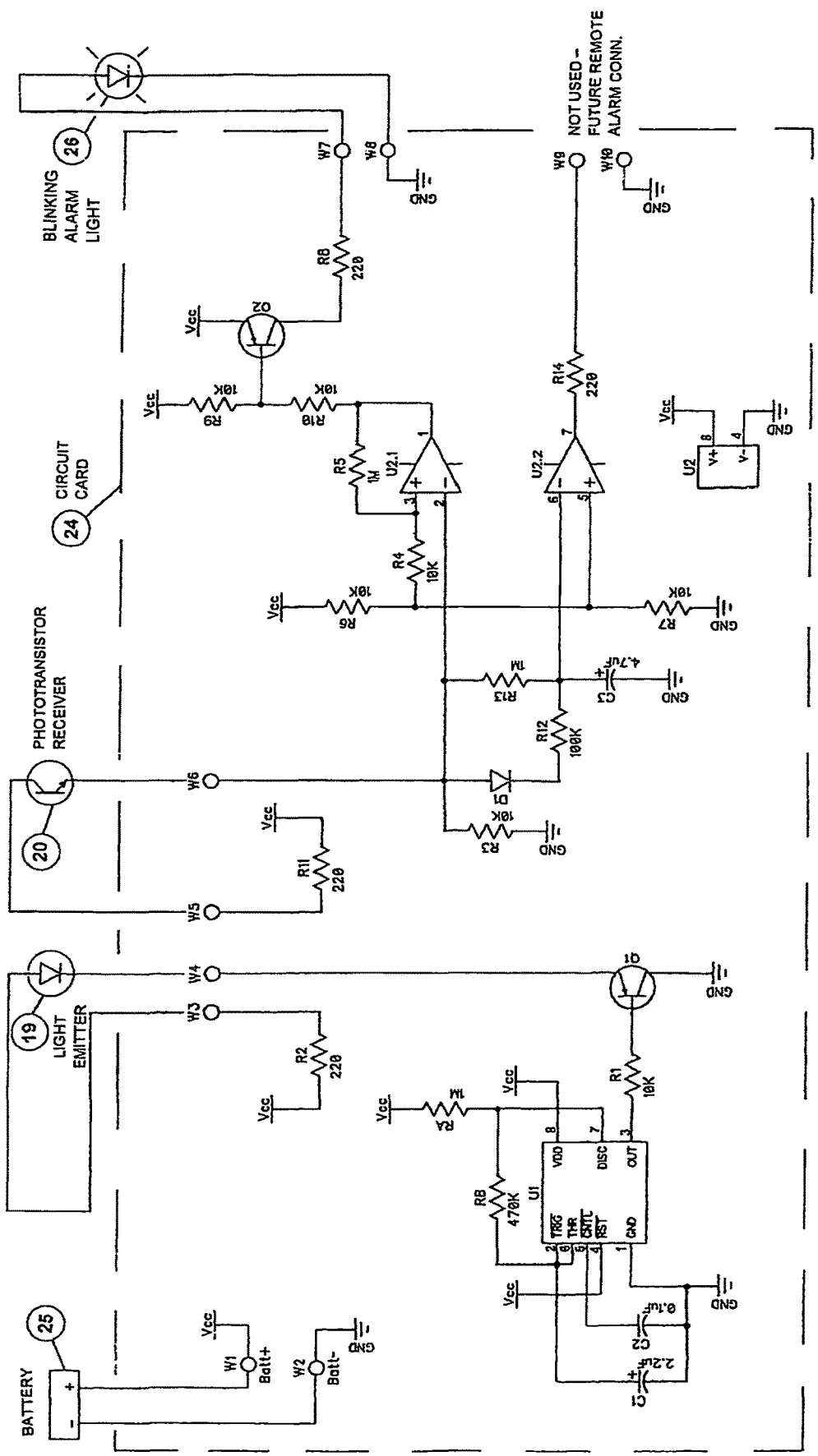
FIG. 19 illustrates the water flow detector assembly circuit card schematic and other connections.

Circuit Card description (Ref. FIG. 19). The battery 25 supplies electrical power to the circuit card 24, and the circuit card is connected to receive input from the optical electronic devices, emitter 19 and receiver 20 which inputs float position signal to the circuit card, and output from the circuit card turns the blinking alarm light on and off.

The operation of the circuit card is centered around a low-power version of the popular 555 timer integrated circuit of which various versions have been used for many years, and the other types of parts on the circuit card also have long histories.

The 555 timer, UI, is connected as an astable multivibrator, that is its output is high (Vcc) part of the time and low (GND) another part of the time. The high time (about 3 seconds) and low time (about 1 second) is set by the values of capacitor CI and resistors RA and RB.

When UI output is high, that turns off transistor QI, which then turns off emitter 19. When emitter 19 is off that causes phototransistor 20 to be off, so the circuit at pin 2 of comparator U2.1 will be low, and pin 6 of U2.2 will be low. Pin 3 of U2.1 and pin 5 of U2.2 will be at voltage approximately 0.5 * Vcc. U2.1 switches its output (pin 1) based on comparison of voltages at its inputs pin 2(−) and pin 3(+), so its output will be high, that is its internal open-collector output will be off and cannot conduct current into pin 7 to GND, so transistor Q2 will be off which will turn off the blinking light 26. U2.2 switches its output (pin 7) based on comparison of voltages at its inputs pin 6(−) and pin 5(+) so its output will be high, that is its internal open-collector output will be off and cannot conduct current into pin 7 to GND.

When UI output is low, that turns on transistor QI which turns on emitter 19, but if light fron 19 is prevented from reaching phototransitor 20, the outputs of U2.1 and U2.2 will still be off as mentioned above.

But if the float position is above the alarm position, when UI output turns low, that will allow light from emitter 19 to reach phototransistor 20 which will turn it on to cause the voltage at input pin 2 of U2.1 and input pin 6 of U2.2 to go higher than the inputs pin 3 of U2.1 and pin 6 of U2.2 . The output pin 1 of U2.1 will switch low to turn on transistor Q2 to turn on the blinking light.

When the phototransistor turns off, either because the cycling UI output goes high, or float position goes below the alarm position, that causes the output of U2.1 to turn off the blinking light.

A possible remote alarm could be turned on and off as follows: When the phototransistor turns on and causes the U2.2 pin 6 input to go higher than pin 5 the output pin 7 of U2.2 will switch low, so, if an output circuit is connected, that will allow current to flow into U2.2 pin 7 open-collector output to GND. When the phototransistor turns off the blinking light, the time delay by diode DI, resistors R12 and R13, and capacitor C3 keeps U2.2 output low long enough for it to remain steady during about 2 cycles of the blinking light, and then to allow it to go high if phototransistor stays off after that time.

For more detailed list of material in the Circuit Card WX01, refer to List of Material for Circuit Card WX01 that is included as FIG. 21.

The invention claimed is:

1. A water flow detector piping bypass device, comprising:
   an inverted-U-shaped piping assembly that detects downstream flow of water in a water pipe;
   wherein the inverted-U-shaped piping assembly is vertically oriented;
   wherein water flows through the water pipe;
   wherein a check valve is installed in the water pipe;
   wherein the inverted-U-shaped piping assembly comprises:
      inlet piping and outlet piping;
         wherein the inlet piping comprises an inlet end;
         wherein the outlet piping comprises an outlet end;
         wherein the inlet end of the inlet piping is connected to the water pipe upstream from the check valve;
         wherein the outlet end of the outlet piping is connected to the water pipe downstream from the check valve;
         wherein the inlet piping is connected to the outlet piping through an inverted-U-shaped piping elbow;
         wherein the inverted-U-shaped piping elbow comprises an inlet side and an outlet side;
         wherein the inverted-U-shaped piping elbow either comprises one or more fittings or is formed integrally with the outlet piping;
      a transparent float chamber;
         wherein the transparent float chamber is connected to the inlet piping;
         wherein the transparent float chamber comprises a transparent pipe;
         wherein the transparent pipe is composed of a transparent material;
            wherein the transparent pipe is vertically oriented to have a top end and a bottom end;
            wherein the bottom end of the transparent pipe connects, either directly, indirectly, or integrally, to the inlet piping;
            wherein the top end of the transparent pipe connects, either directly, indirectly, or integrally, to the inlet side of the inverted-U-shaped piping elbow;
      a top float stop and a bottom float stop, the top float stop and the bottom float stop being arranged inside the transparent pipe;
      a float arranged inside the transparent pipe between the top float stop and the bottom float stop;
         wherein the float is configured to move between the top float stop and the bottom float stop;
         wherein the top float stop restricts the float from moving above the top float stop, and the bottom float stop restricts the float from moving below the bottom float stop;
      a bottom float stop-spacer comprising tubing arranged inside the transparent pipe,
         wherein a bottom end of the bottom float stop-spacer is aligned with the bottom end of the transparent pipe;
         wherein a top end of the bottom float stop-spacer is arranged as the bottom float stop;
   an optical emitter and an optical receiver;
      wherein the optical emitter and the optical receiver are arranged external to, and on opposite sides of, the transparent pipe;
      wherein a height of the optical transmitter between the bottom and the top of the transparent pipe is substantially the same as a height of the optical receiver between the bottom and the top of the transparent pipe;
      wherein the optical emitter transmits optical radiation;
      wherein the optical radiation transmitted by the optical emitter travels through the transparent pipe, through water inside the transparent pipe, and out an opposite side of the transparent pipe;
      wherein the optical receiver receives the optical radiation transmitted by the optical emitter after the radiation travels out the opposite side of the transparent pipe;
   electric circuitry;
      wherein the optical emitter and the optical receiver are electrically coupled to the electric circuitry;
      wherein the electric circuitry is electrically coupled to a source of electric energy;
      wherein the electric circuitry comprises one or more logic circuits;
      wherein the electric circuitry is electrically coupled to a visual indicator that is configured to provide a visual indication;
      wherein, when the float comes between the optical emitter and the optical receiver, the float blocks the optical radiation from reaching the optical receiver;
      wherein when the optical radiation is blocked from reaching the optical receiver, the one or more logic circuits detect that the optical radiation is not received by the optical receiver;
      wherein, when the one or more logic circuits detect that the optical radiation is not received by the optical receiver, the indicator is not activated, and the visual indicator does not provide a visual indication;
      wherein when the float rises above the optical radiation between the optical emitter and the optical receiver, the float does not block the optical radiation from reaching the optical receiver;
      wherein, when the optical radiation is not blocked from reaching the optical receiver, the optical radiation is received by the optical receiver, and the one or more logic circuits detect that the optical radiation is received by the optical receiver;
      wherein when the one or more logic circuits detect that the optical radiation is received by the optical receiver, the visual indicator is activated, and the visual indicator provides a visual indication;
      wherein a minimum height of the float above the optical radiation at which the float does not block the optical radiation from reaching the optical receiver corresponds to a minimum differential water pressure at which the float does not block the optical radiation from reaching the optical receiver;
      wherein the minimum height of the float above the height of the optical radiation at which the float does not block the optical radiation from reaching the optical receiver corresponds to a minimum rate of water flow in the transparent pipe at which the float does not block the optical radiation from reaching the optical receiver;

wherein the minimum rate of water flow in the transparent pipe at which the float does not block the optical radiation from reaching the optical receiver corresponds to a minimum rate of water flow in the inverted-U-shaped piping assembly at which the float does not block the optical radiation from reaching the optical receiver;

wherein the height at which the optical emitter and the optical receiver are arranged on opposite sides of the transparent float chamber determines the minimum differential water pressure at which the float does not block the optical radiation from reaching the optical receiver;

wherein the height at which the optical emitter and the optical receiver are arranged on opposite sides of the transparent float chamber determines the minimum rate of water flow in the transparent pipe at which the float does not block the optical radiation from reaching the optical receiver;

wherein the height at which the optical emitter and the optical receiver are arranged on opposite sides of the transparent float chamber determines that the minimum height of the float above the optical radiation at which the float does not block the optical radiation from reaching the optical receiver corresponds to a differential water pressure at the check valve, such that the differential water pressure at the check valve is less than a minimum differential water pressure sufficient to open the check valve;

wherein when the float rises to, or above, the minimum height of the float above the optical radiation at which the float does not block the optical radiation from reaching the optical receiver, the one or more logic circuits detect that the optical radiation is received by the optical receiver, and the visual indicator is activated to produce the visual indication, which corresponds to a flow of water downstream from the check valve and which is consistent with one or more leaks in piping downstream from the check valve.

2. The water flow detector piping bypass device of claim 1, wherein the source of electric energy is one or more batteries.

3. The water flow detector piping bypass device of claim 1, wherein the electric circuit is arranged on a circuit card.

4. The water flow detector piping bypass device of claim 1, wherein the visual indicator is an indicator light.

5. The water flow detector piping bypass device of claim 4, wherein the visual indication is blinking of the indicator light.

6. The water flow detector piping bypass device of claim 1, wherein the optical emitter and the optical receiver are adjustably arranged at substantially the same height between the bottom and the top of the transparent pipe to adjustably select the minimum differential water pressure at which the optical radiation from the optical emitter is not blocked from reaching the optical receiver.

7. The water flow detector piping bypass device of claim 1, wherein the optical emitter and the optical receiver are removably attached to the transparent pipe at substantially the same height between the bottom and the top of the transparent pipe to adjustably select the minimum differential water pressure at which the optical radiation from the optical emitter is not blocked from reaching the optical receiver.

8. The water flow detector piping bypass device of claim 1, further comprising a housing, wherein arranged in the housing is the inverted-U-shaped piping assembly or one or more of: the inlet piping, the outlet piping, the inverted-U-shaped piping elbow, the transparent float chamber, the optical emitter, the optical receiver, the electric circuitry, the source of electric energy, and the visual indicator.

9. The water flow detector piping bypass device of claim 8, wherein the inlet piping extends from inside the housing to outside the housing to connect to the water pipe upstream from the check valve.

10. The water flow detector piping bypass device of claim 8, wherein the outlet piping extends from inside the housing to outside the housing to connect to the water pipe downstream from the check valve.

11. The water flow detector piping bypass device of claim 8, wherein the housing is cylindrical.

12. The water flow detector piping bypass device of claim 8, wherein the housing is formed from polyvinyl chloride ("PVC").

13. The water flow detector piping bypass device of claim 8, wherein the housing protects the inverted-U-shaped piping assembly.

14. The water flow detector piping bypass device of claim 8, wherein the housing protects the inverted-U-shaped piping assembly when the housing is arranged partly below ground and partly above ground.

15. The water flow detector piping bypass device of claim 14, wherein the visual indication from the visual indicator is visible from outside the housing when the housing is arranged partly below ground and partly above ground.

* * * * *